United States Patent

[11] 3,544,714

[72] Inventor Eric D. Stoll
Piscataway, New Jersey

[21] Appl. No. 681,289
[22] Filed Nov. 7, 1967
[45] Patented Dec. 1, 1970

[73] Assignee Bell Telephone Laboratories, Incorporated
Murray Hill, New Jersey
a corporation of New York

[54] SYNCHRONOUS VIDEO CLAMPER WITH GATING MEANS TO MINIMIZE NOISE INTERFERENCE
5 Claims, 7 Drawing Figs.

[52] U.S. Cl. ........ 178/7.3
[51] Int. Cl. ........ H04n 5/18
[50] Field of Search ........ 178/7.3(DC), 7.5(DC); 330/311, 321, 325; 307/237; 328/168, 170, 175

[56] References Cited

UNITED STATES PATENTS

| | | | |
|---|---|---|---|
| 2,368,096 | 1/1945 | Bedford | 178/7.2 |
| 3,246,080 | 4/1966 | Ritchey, Jr. | 178/7.1(DC)UX |
| 3,315,033 | 4/1967 | Sennhenn | 178/7.1(DC)UX |

*Primary Examiner*—Robert L. Griffin
*Assistant Examiner*—Alfred H. Eddleman
*Attorneys*—R. J. Guenther and E. W. Adams, Jr.

ABSTRACT: A synchronous video clamping circuit which minimizes the possibility of clamping error under severe impulse noise conditions. Incoming synchronizing pulses drive a resonant RLC circuit which provides a gating signal and, in turn, operates through two gates to control both the clamping operation and its own excitation. The gates are enabled when the positive peak of the resonant circuit signal and the incoming synchronizing pulse occur simultaneously. All noise pulses occurring outside of the gating interval formed by the resonant circuit signal are completely blocked out.

INVENTOR
E. D. STOLL
BY Leonard R. Arnold
ATTORNEY

GATE

PULSE FORMING NETWORK

CLAMP GATE 16

DRIVING CCT. 11 FOR VERTICAL SYNC. LOCKOUT 13

RECOVERY CIRCUIT 17

SYNCHRONOUS VIDEO CLAMPER WITH GATING MEANS TO MINIMIZE NOISE INTERFERENCE

BACKGROUND OF THE INVENTION

This invention relates to synchronous clamping circuits and, more particularly, to gated synchronous clamping circuits for use in video systems to minimize the possibility of noise interference in the clamping operation.

In a video system the video signal is composed of time varying video information, a direct-current control level, and synchronizing pulses which are constant in magnitude and occur in a regular time sequence. One method of maintaining the direct-current control level is direct-current coupling. For the most part, this method is unsatisfactory because it is uneconomical and induced noise signals must be separately removed. Another method which is to be considered here is alternating-current coupling followed by direct-current restoration. In this method the direct-current level is restored by clamping the video information signal to a reference voltage. In a synchronous clamper the incoming synchronizing pulses are used to trigger the clamping operation. The peaks of the synchronizing pulses are then clamped to a reference potential to restore the direct-current control level to the system. With prior synchronous clampers, however, noise impulses triggered the clamping circuit at an improper interval, i.e., when the synchronizing pulses were not present, and caused clamping at the wrong level. This resulted in severe signal distortion which ultimately caused the video receiver to lose synchronization.

SUMMARY OF THE INVENTION

It is, accordingly, an object of the present invention to insure proper clamping operation even under severe impulse noise conditions. In accordance with the invention, the incoming synchronizing pulses in the video signal are used to excite a resonant RLC circuit, commonly called a flywheel, which in turn operates through two gates to control both the clamping operation and its own excitation. The first gate placed before the resonant or flywheel circuit prevents unwanted signals from affecting the frequency or phase of the flywheel signal. The gate is enabled and thereby excites the flywheel only when the positive peak of the flywheel signal and the incoming synchronizing pulses occur simultaneously.

The flywheel signal and the synchronizing pulses are also fed into the second gate which, through a switching circuit, controls the clamping interval. When the synchronizing pulse and the flywheel peak occur simultaneously, this second gate generates a pulse and excites a switching circuit which clamps the voltage on a clamping capacitor to a fixed reference level. A noise impulse will not pass through the gate to trigger the clamping operation unless it occurs when the flywheel signal is near its positive peak. This flywheel gating arrangement, therefore, improves the operation of the clamping circuit under high impulse noise conditions because all other noise impulses are completely blocked by the second gate.

It is a further object of the invention to limit the voltage excursion possible in a single clamping interval so that the system can recover relatively quickly from an improper clamping operation. The excursion is limited by placing a small capacitor in the clamp gate circuit which temporarily charges or discharges to reduce the change in the clamping capacitor voltage during the clamping interval.

DETAILED DESCRIPTION

Figure 3:
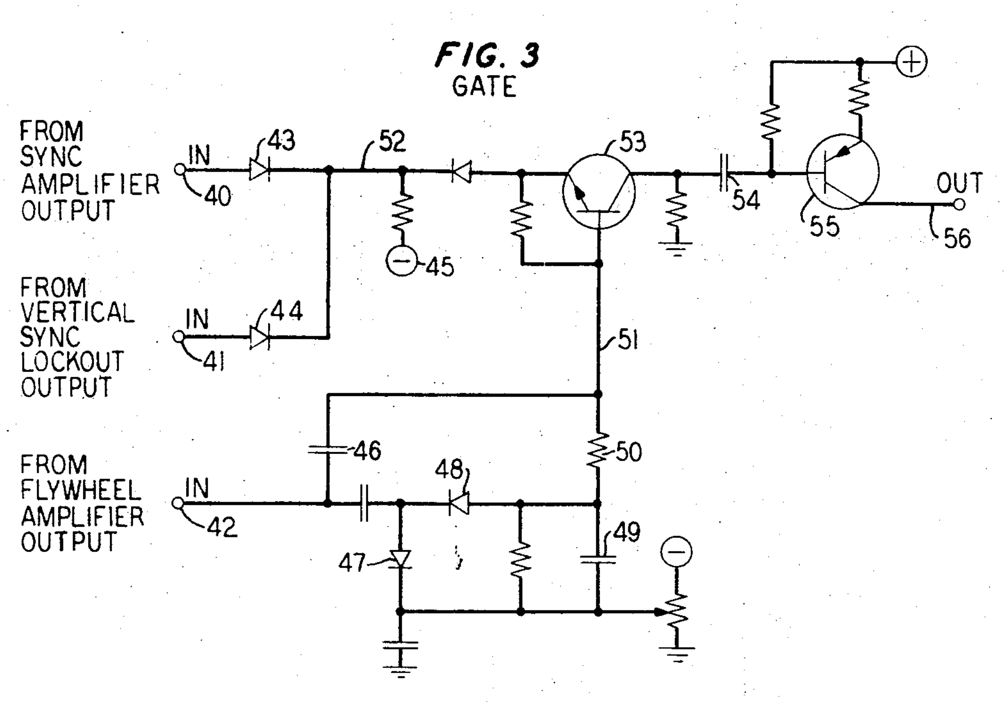
FIG. 3 is a schematic circuit diagram of gates 1 and 2 shown in block form in FIG. 1.

The standard television signal used in the U.S. is described in detail in FIG. 25-3 on page 980 of Terman, Electronic and Radio Engineering, published by McGraw-Hill Book Company, (4th Ed. 1955). The television signal contains picture components and synchronizing components. The synchronizing components are applied to the television signal during regularly occurring blanking intervals. A single horizontal synchronizing pulse occurs during the horizontal blanking interval to synchronize the horizontal retrace on the picture tube. A series of regularly spaced equalizing pulses and vertical and horizontal synchronizing pulses occur during the vertical blanking interval to synchronize the vertical retrace on the picture tube and begin the horizontal sweep at the top of the picture tube.

Figure 1:
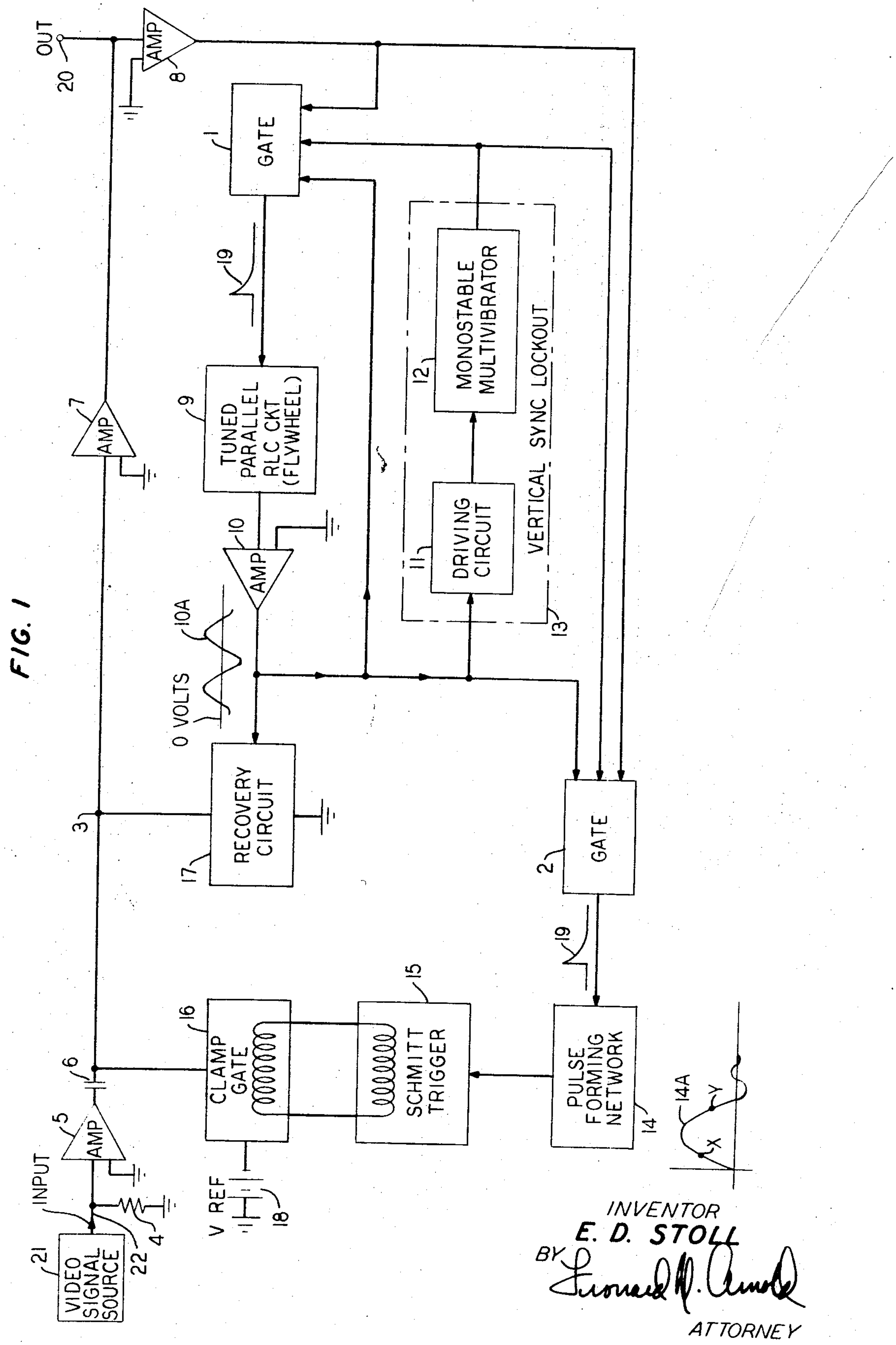
FIG. 1 is a block diagram of a clamping circuit embodying the invention.
Figure 2:
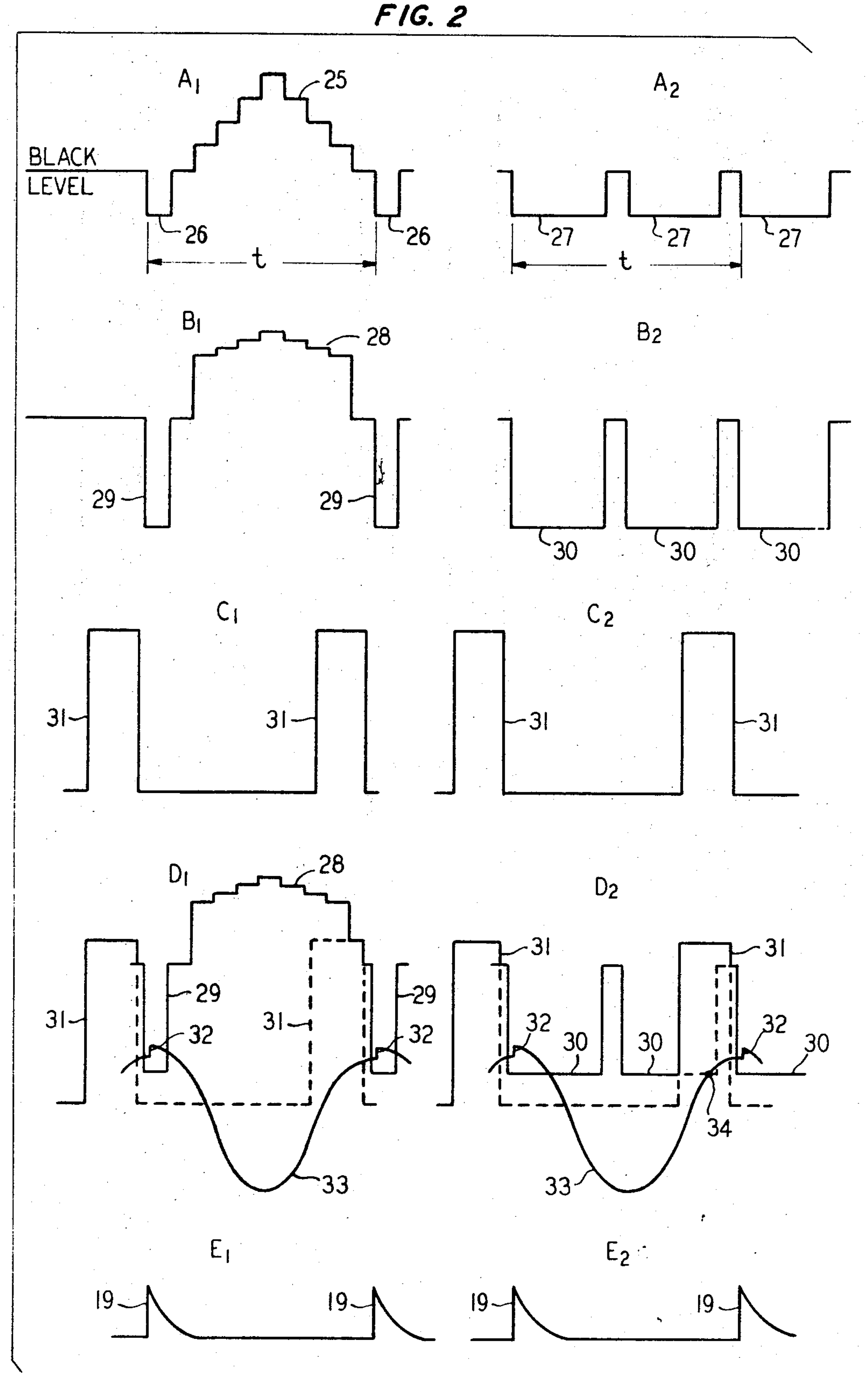
FIG. 2 is a series of waveforms illustrating the operation of the gates 1 and 2 and the vertical sync lockout shown in FIG. 1.

The video signal shown in FIGS. 2A1 and 2A2 shows two portions of the standard television signal which are of particular significance in the description of the embodiment of the invention. FIG. 2A1 shows the picture information component 25 and two negative-going horizontal synchronizing pulses 26. FIG. 2A2 shows the vertical synchronizing pulses 27 which occur in a regular time sequence with the horizontal and equalizing pulses in the vertical blanking interval. The time "t"between the horizontal synchronizing pulses 26 is the same as the time "t" between the leading edges of the first and third vertical synchronizing pulses 27. It is noted that in the present embodiment the information signal is positive-going and the synchronizing pulses are negative-going from the black level. It should be understood that in accordance with the principles of the invention, the circuit elements may be arranged to operate equally well in the situation where the information signal is negative-going and the synchronizing pulses are positive-going.

As shown in FIG. 1, the video input signal from source 21 is applied to the input terminal 22 of the clamping circuit. Connected between input terminal 22 and output terminal 20 of the clamping circuit is an amplifier 5, capacitor 6, and amplifier 7 in that order. The function of a clamping circuit is to produce at output terminal 20 the video signal at the proper direct-current level. In accordance with this invention, this is accomplished by setting the direct-current voltage on capacitor 6 to a predetermined value during a clamping interval initiated by the simultaneous occurrence of a synchronizing pulse received from source 21 and an internally generated gating signal produced by an RLC resonant circuit 9, commonly called a flywheel. The flywheel 9 is tuned to the frequency of the received horizontal synchronizing pulses, which is also the frequency of the odd numbered vertical synchronizing pulses. The flywheel is excited by the incoming synchronizing pulses, which occur at the frequency corresponding to the horizontal synchronizing pulses, and operates through a gated feedback path to control its own excitation. In addition, the output of flywheel 9 controls the clamping operation so that all noise pulses occurring outside of the gating interval formed by the positive peaks of the flywheel signal 10A are effectively prevented from initiating the clamping operation. In the present embodiment the flywheel resonates at a center frequency of 15,750 Hertz and has a Q of 20.

Amplifiers 5 and 7 are unity gain high impedance amplifiers. The former serves as an isolation amplifier to isolate the clamping circuit from the transmission line and the latter prevents the rapid discharge of capacitor 6. Aside from resistor 4, which serves as a matching resistor to match the input resistance of the clamping circuit to the resistive component of the impedance of the transmission line, all the rest of the apparatus shown in FIG. 1 serves to insure that the direct-current voltage at the junction 3 of capacitor 6 and amplifier 7 is clamped to a reference voltage 18 during the predetermined clamping interval. Since amplifiers 5 and 7 are of unity gain the alternating-current signal from source 21 is faithfully reproduced at output terminal 20.

In accordance with this invention, the flywheel 9 is triggered by both its own output signal and incoming synchronizing pulses. The signal at output terminal 20 is applied to a first input of gate 1 by means of high impedance amplifier 8, which is biased to amplify only the negative-going synchronizing pulses. A second input terminal of gate 1 receives a signal fed back from the output of the flywheel 9 after it is amplified by amplifier 10. Gate 1, to be described in detail below, will produce an output signal only when a synchronizing pulse from the amplifier 8 occurs simultaneously with the peak positive voltage of the flywheel signal from amplifier 10. Gate 1, therefore, controls the excitation of the flywheel so that it will resonate in the proper frequency and phase with the incoming horizontal synchronizing pulses. Auxiliary apparatus comprising vertical sync lockout circuit 13, to be described in detail below, temporarily inhibits gate 1 to prevent premature enablement by the even numbered vertical synchronizing pulses.

As with the operation of gate 1, the synchronizing pulses at the output of amplifier 8, the output of the flywheel 9, and output of vertical sync lockout circuit 13, form the three inputs to control gate 2, which produces an output signal to clamp the voltage at terminal 3 to the direct-current reference potential 18. Here again, the interval during which the gate 2 is enabled is limited by the action of the vertical sync lockout circuit 13 to reduce the possibility of improper clamping operation on reception of the even numbered vertical synchronizing pulses. The actual clamping operation is performed by circuitry comprising pulse forming circuit 14, Schmitt trigger circuit 15 and clamp gate 16. When gate 2 is enabled it generates an output pulse 19, shown in FIGS. 1, 2E1 and 2E2, of very narrow duration, which is transformed into a pulse 14A of predetermined width by pulse forming circuit 14. The output of circuit 14, in turn, governs the state of Schmitt trigger circuit 15. When the amplitude of the input 14A to Schmitt trigger circuit 15 is below a predetermined value Y shown, the Schmitt trigger circuit produces a relatively low output voltage so that clamp gate 16 is disabled and there is no connection from capacitor 6 to source 18. When, in response to the generation of a pulse by circuit 14, the input voltage to Schmitt trigger circuit 15 exceeds a predetermined value X, the circuit 15 produces an output voltage causing clamp gate 16 to connect terminal 3 to the source of reference voltage 18. In accordance with this invention, this clamping action can occur only during a relatively narrow gating interval determined by the flywheel output. Outside of this interval, all noise pulses which might otherwise be mistaken for synchronizing pulses are blocked out.

Recovery circuit 17, to be described in detail below, inserts a relatively small resistance in parallel with the high impedance amplifier 7 when there is no signal at the output of flywheel amplifier 10 before the clamping operation is begun. Since, in this embodiment, amplifier 7 is an operational amplifier employing negative feedback, the low resistance temporarily inserted by the recovery circuit is necessary to prevent the feedback bias current of the amplifier from causing a substantial positive direct-current voltage at its input, which would, in turn, result in improper biasing of synchronizing pulse amplifier 8. With an improper bias, amplifier 8 will not properly amplify the negative-going synchronizing pulses and will thereby fail to properly trigger gates 1 and 2.

The operation of gates 1 and 2 and the vertical sync lockout circuit 13, shown in FIG. 1, can be described in greater detail by reference to the waveforms shown in FIG. 2. FIG. 2A1 shows the horizontal synchronizing pulses 26 and the video information signal 25; and FIG. 2A2 shows the vertical synchronizing pulses 27. It is seen that the horizontal pulses are much narrower than the vertical pulses, but both are repeated in a regular time sequence, and the time "t" between the leading edge of the first and second horizontal pulses is the same as the time "t" between the leading edge of the first and the third vertical synchronizing pulses.

FIG. 2B1 shows the output of the synchronizing pulse amplifier 8. It can be seen that the horizontal synchronizing pulses 29 are amplified without inversion and that the upper portion of the video information signal 28 is limited by saturation within the amplifier 8. Likewise, FIG. 2B2 shows the amplified vertical synchronizing pulses 30.

FIGS. 2C1 and 2C2 show the output of the vertical sync lockout circuit 13, which provides a positive-going pulse 31 just prior to the synchronizing pulses to prevent premature enablement of gates 1 and 2 by the trailing edges of the even numbered vertical synchronizing pulses. As shown in FIG. 2D2, when the flywheel signal intersects the leading edge of the first vertical synchronizing pulse 30, gates 1 and 2 are enabled and output pulse 19, shown in FIG. 2E, is produced. However, because of the width of the vertical pulses and the relatively flat top of the flywheel signal, it is possible that the flywheel signal will intersect the trailing edge of the second vertical synchronizing pulse and gates 1 and 2 improperly triggered at point 34. If gates 1 and 2 are triggered at point 34 the flywheel signal will not remain in synchronization with the horizontal synchronizing pulses and the direct-current voltage on capacitor 6 will not be maintained at the proper level because the reference voltage will no longer be clamped to the peaks of the synchronizing pulses. In the presence of lockout pulse 31, gates 1 and 2 are inhibited so that premature enablement by the second vertical synchronizing pulse will not occur, and the gates will be enabled at point 32.

Figure 6:
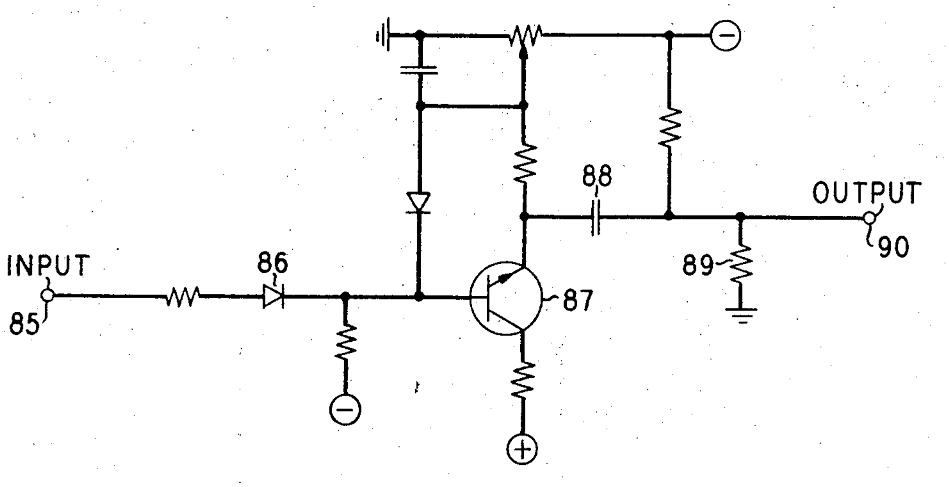
FIG. 6 is a schematic circuit diagram of the driving circuit 11 for the vertical sync lockout 13 shown in block form in FIG. 1.

The vertical sync lockout circuit 13 is composed of driving circuit 11 and monostable multivibrator 12, shown in block diagram form in FIG. 1. The monostable multivibrator 12, many types of which are well known to those skilled in the art, provides the vertical sync lockout pulse 31 when it is excited by driving circuit 11. Driving circuit 11, shown in detail in FIG. 6, is but one illustration of many of such circuits which may be triggered at a predetermined voltage level to produce a relatively narrow pulse output. Input 85 is connected to receive signals from the flywheel amplifier 10 and the circuit functions to sense accurately when the flywheel signal 10A goes positive. When the flywheel signal goes positive, diode 86 is forward biased and transistor 87 conducts, sending a pulse through capacitor 88 to output terminal 90 to trigger the monostable multivibrator 12. Capacitor 88, in conjunction with resistor 89, operates as a differentiating circuit to produce the triggering pulse at output 90. The lockout pulse 31 is formed when the monostable multivibrator circuit 12 changes state in response to the triggering pulse from the driving circuit. The monostable circuit is timed to revert back to its single stable state just prior to the arrival of the leading edges of the amplified horizontal synchronizing pulses 29 and the first and third vertical synchronizing pulses 30, as shown in FIGS. 2D1 and 2D2.

It can be seen in FIG. 2D1 that the vertical sync lockout pulse 31 has no effect on the triggering by the horizontal synchronizing pulses since the lockout pulse ends prior to the leading edges of those pulses. In short, the lockout pulse acts only to inhibit gates 1 and 2 during an interval of time encompassing the trailing edges of the even numbered vertical synchronizing pulses. Thus, in the absence of a lockout pulse when the peak of the flywheel signal 33 intersects the leading edges of the horizontal synchronizing pulses, gates 1 and 2 will be enabled and pulse 19, shown in FIG. 2E1, will appear at their output. When the pulse 19 from gate 1 is fed into the flywheel 9, the flywheel signal takes a slight jump at point 32 to reflect the sudden increase of energy into the circuit.

Gates 1 and 2 in FIG. 1 are shown in detail in FIG. 3. Both function as inhibit gates and both are triggered in the same manner by the same three inputs. The inputs 40, 41 and 42 to gates 1 and 2 are derived, respectively, from the sync amplifier 8, the vertical sync lockout 13 and the flywheel amplifier 10. The flywheel signal at input 42 is coupled directly to point 51 through capacitor 46. The flywheel signal is also rectified by diodes 47 and 48 and filtered by capacitor 49 to provide a negative direct-current bias voltage, applied directly to point 51 through the resistor 50. Because of the negative bias the flywheel signal at point 51 never goes positive. When the negative-going synchronizing pulses are present at input 40, diode 43 is back biased and point 52 goes to a negative potential predetermined by the negative voltage source 45. In the presence of the synchronizing pulses at input 40, the peak of the biased flywheel signal at point 51 puts point 51 at a higher potential than point 52 and the transistor 53 conducts. The resulting current pulse in the collector of transistor 53 is coupled through capacitor 54 to the base of transistor 55. Transistor 55 amplifies the pulse from transistor 53, producing the pulse 19 shown in FIGS. 1 and 2E2. The amplification of transistor 55 can be varied readily to produce the desired amplitude of pulse at the output 56.

When a positive-going lockout pulse 31 is present at input 41, diode 44 conducts and point 52 is held at higher potential than point 51 so that the transistor 53 cannot conduct. Thus, in summary, the three conditions necessary for the two gates to be enabled are:

1. the synchronizing pulse must be present;
2. the flywheel amplifier signal must be near its positive peak; and
3. the positive-going pulse from the vertical sync lockout circuit must not be present.

Figure 4:
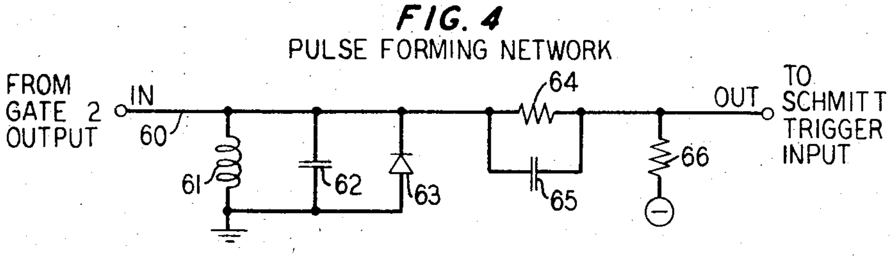
FIG. 4 is a schematic circuit diagram of the pulse forming network 14 shown in block form in FIG. 1.

The pulse forming network 14, shown in detail in FIG. 4, is but one illustration of many such circuits well known to those skilled in the art. The output pulse 19 from gate 2 is applied at input 60, causing a signal oscillation in inductor 61 and capacitor 62. The diode 63 operates to insure that the pulse forming network will oscillate for only one-half of a cycle, thereby providing a single positive sinusoidal pulse 14A, shown in FIG. 1. Resistors 64 and 66 and capacitor 65 provide proper biasing for the output pulse 14A.

The Schmitt trigger circuit 15, shown in block diagram form in FIG. 1, is a well known bistable multivibrator circuit characterized by a pair of emitter coupled transistors. In accordance with this invention, the Schmitt trigger circuit is adjusted to have one of its bistable states in a negative level and the other of its states at a positive level. It is triggered from one of its states when its input reaches a certain positive value and it returns to its second state when its input goes below another positive level. Thus, at some potential "X" on the positive-going portion of the timing pulse 14A from the pulse forming network 14 the Schmitt trigger 15 switches to its positive state. On the negative-going portion of the timing pulse, at potential "Y", the Schmitt trigger reverts to its negative state. The interval between "X" and "Y" is the clamping interval and in this case it is timed to be about 0.8 microsecond, so as to be less than the duration of the narrowest synchronizing pulse.

Figure 5:
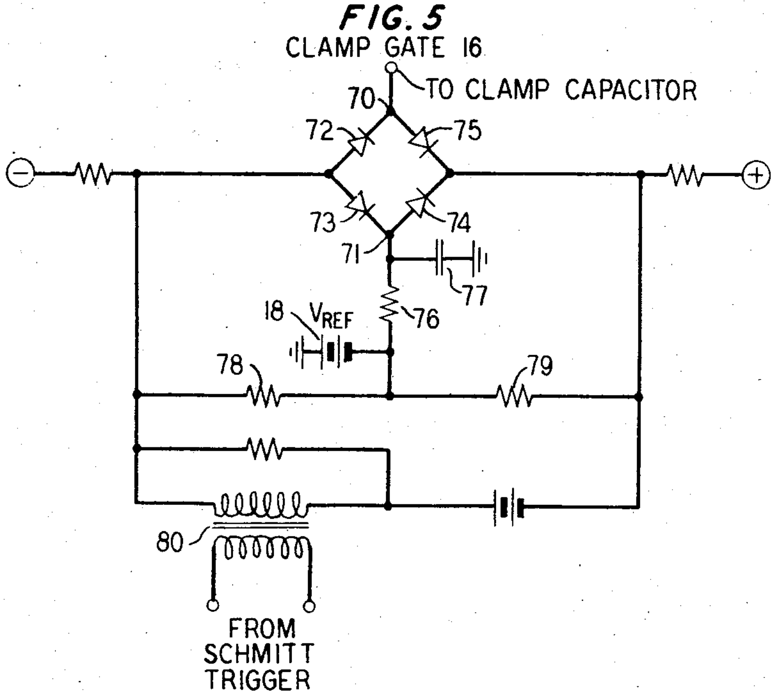
FIG. 5 is a schematic circuit diagram of the clamp gate 16 shown in block form in FIG. 1.

The output of the Schmitt trigger circuit 15 is transformer coupled on a one-to-one ratio to the transformer input 80 of the clamping gate 16, shown in detail in FIG. 5. When the Schmitt trigger circuit 15 is in its negative state, the diodes 72, 73, 74 and 75 in the diode bridge are reverse biased so that point 70 is not connected to point 71. During the clamping interval, when the Schmitt trigger is switched to its positive potential, the diodes 72, 73, 74 and 75 are forward biased so that the points 70 and 71 are effectively switched to the same potential. Since point 71 in steady state is at the same potential as the reference voltage 18, the capacitor 6 is effectively clamped to the reference voltage 18 when the Schmitt trigger circuit 15 changes to its positive state. Resistors 78 and 79 are balancing resistors to balance out spurious noise signals in the clamp gate.

Capacitor 67, connected to point 71 in the clamp gate 16, limits the voltage excursion possible on capacitor 6 in any given clamping interval. If it is assumed, for example, that the clamping operation is triggered at the wrong time, and that the voltage of terminal 3 is at some high positive value rather than at the voltage corresponding to the negative peak of the synchronizing pulse, current will flow in the clamp gate between points 70 and 71 and the capacitor 77 will tend to charge momentarily. Capacitor 6, therefore, is no longer effectively clamped to the reference potential 18, but is clamped to some higher potential corresponding to the temporary voltage on capacitor 77. The voltage excursion on the capacitor 6, therefore, is less than it would be for a single clamping interval if capacitor 77 were not present. In between clamping intervals the capacitor 77 will discharge through the resistor 76 and return to its normal voltage at the reference potential. In the next succession of clamping intervals, when the clamping gate is triggered at a proper time, the voltage on capacitor 6 will be readjusted so that capacitor 6 will be at the reference potential during the clamping operation.

Figure 7:
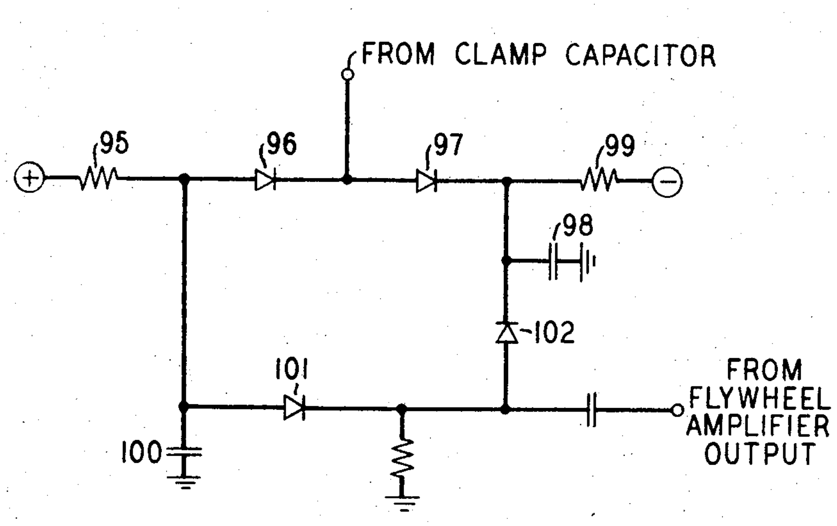
FIG. 7 is a schematic circuit diagram of the recovery circuit 17 shown in block form in FIG. 1.

The recovery circuit 17, shown in detail in FIG. 7, operates like a switch between the clamping capacitor 6 and ground potential to place a resistance equal to the parallel combination of the resistances 95 and 99 in circuit with the amplifier 7 when the circuitry is first turned on and before the clamping operation has clamped terminal 3 to the proper direct-current level. The low resistance in parallel with the high impedance amplifier 7 is necessary to prevent the feedback bias current of the amplifier 7 from causing a substantial positive direct-current potential at its input. The high positive direct-current potential at amplifier 7 would, in turn, cause improper recovery of the negative synchronizing pulses in the synchronizing pulse amplifier 8. The operation of circuit 17 is controlled by circuits 9 and 10 so that in the presence of an input signal received from the flywheel amplifier 10, the diodes 96 and 97 are back biased and the resistors 95 and 99 are no longer in circuit with amplifier 7. Diodes 101 and 102 operate to rectify the flywheel signal. The voltage on the capacitors 98 and 100 is maintained at a sufficiently high value by the rectified flywheel signal to keep the diodes 96 and 97 back biased. Thus, during steady state operation, when point 3 is maintained at the proper direct-current level by the clamping action, the low resistance is no longer necessary and the recovery circuit 17 is disconnected from the clamping circuit.

It should be understood that the above-described embodiment is merely illustrative of the principles of the invention. Various modifications in synchronous clamper circuits in accordance with the invention may be effected by persons skilled in the art without departing from the spirit and scope of the invention.

I claim:

1. A synchronous video clamper comprising in combination:

a clamping capacitor with an input and an output terminal;

a source of video signals containing synchronizing pulses connected to the input of said capacitor;

a reference voltage source;

means connected to the output of said clamping capacitor for generating a periodic gating signal which rises above a predetermined voltage level at a time coincident with the occurrence of said synchronizing pulses contained in said signal from said video signal source when said video clamper is properly synchronized, gating means with first and second input terminals, said gating signal applied at said first input terminal, means connecting the output terminal of said capacitor to said second input terminal so that synchronizing pulses are applied to said second input terminal, said gating means being enabled only when said gating signal rises above said predetermined voltage level simultaneously with the occurrence of said synchronizing pulses; and switching means connected between the output of said clamping capacitor and said reference voltage and responsive to said gating means so that said switch is closed only when said gating means is enabled.

2. Apparatus as defined in claim 1 wherein said means for generating a gating signal includes a tuned RLC circuit and a gate having at least two inputs, means connecting one input of said gate to the output of said capacitor, means connecting the output of said RLC circuit to a second input of said gate so that said gate generates an output only when the output of said resonant circuit and said synchronizing pulses are applied simultaneously at the input of said gate.

3. Apparatus as defined in claim 1 wherein said switching means includes a second capacitor whose voltage changes to limit the voltage change possible on said clamping capacitor during a single clamping interval when said switching means is closed.

4. A synchronous video clamper to which incoming synchronizing pulses may be applied comprising:

a clamping capacitor with an input and an output terminal;

a high impedance amplifier with an input and output terminal;

a reference voltage source;

means connecting the output of said capacitor to the input of said high impedance amplifier;

switching means connecting the output of said capacitor to said reference voltage source;

a resonant circuit with an input and output terminal;

a first gate connected to the input of said resonant circuit so that said resonant circuit is excited only when said first gate is enabled;

a second gate connected to said switching means so that said switching means is closed only when said second gate is enabled;

means connecting the output of said resonant circuit to said first and second gates; and means connecting the output of said high impedance amplifier to said first and second gates so that said first and second gates are enabled only when the peak of the resonant circuit signal and the incoming synchronizing pulses occur simultaneously.

5. Apparatus as defined in claim 4 wherein said switching means includes a second capacitor whose voltage changes to limit the voltage change possible on said clamping capacitor during a single clamping interval when said switching means is closed.